United States Patent [19]
Gulliford et al.

[11] Patent Number: 5,384,776
[45] Date of Patent: Jan. 24, 1995

[54] AUDIO ROUTING WITHIN TRUNKED RADIO FREQUENCY MULTISITE SWITCH

[75] Inventors: Philip Gulliford; Wim Imron, both of Forest; James L. Teel, Goode, all of Va.

[73] Assignee: Erricsson GE Mobile Communications Inc., Research Triangle Park, N.C.

[21] Appl. No.: 658,636

[22] Filed: Feb. 22, 1991

[51] Int. Cl.⁶ .................................... H04J 3/02
[52] U.S. Cl. ...................... 370/85.1; 370/95.3
[58] Field of Search ............... 370/85.1, 58.1, 95.1, 370/95.3, 94.1, 110.1, 60, 62, 85.8, 80, 45.2, 84; 381/2, 77, 79, 104, 107, 68.2; 455/33, 89, 15, 16; 379/59, 60; 358/133, 136; 340/384, 423, 825.52, 825.51

[56] References Cited
U.S. PATENT DOCUMENTS

| | | | |
|---|---|---|---|
| 4,521,879 | 6/1985 | Gueldenpfennig et al. | 370/62 |
| 4,550,400 | 10/1985 | Henderson, Jr. et al. | 370/85.1 |
| 4,577,310 | 3/1986 | Korsky et al. | 370/67 |
| 4,603,418 | 7/1986 | Townsend | 370/85.8 |
| 4,630,263 | 12/1986 | Townsend et al. | 370/85.8 |
| 4,785,349 | 11/1988 | Keith et al. | 358/136 |
| 4,916,692 | 4/1990 | Clarke et al. | 370/85.1 |
| 4,945,355 | 7/1990 | Blanchette | 370/85.8 |
| 5,072,442 | 12/1991 | Todd | 370/62 |
| 5,122,873 | 6/1992 | Golin | 358/133 |

FOREIGN PATENT DOCUMENTS

| | | | |
|---|---|---|---|
| 2075799A | 11/1981 | United Kingdom | H04Q 7/02 |
| WO91/16797 | 10/1991 | WIPO | H04Q 11/04 |

*Primary Examiner*—Douglas W. Olms
*Assistant Examiner*—Dang Ton
*Attorney, Agent, or Firm*—Nixon & Vanderhye

[57] ABSTRACT

A distributed trunked radio frequency (RF) switching network (switch) distributes audio routing control and processing throughout the switch, thus avoiding a centralized mixing matrix, increasing fault tolerance and providing low routing request latency time. Each audio source (e.g., RF repeater transmitter, dispatch console microphone) is preassigned an audio channel on a time division multiplexed (TDM) digitized audio network or bus. The audio sources continually broadcast digitized audio signals to all other nodes over the TDM network. Audio routing is performed at the audio destinations (e.g., nodes associated with RF repeater receivers, dispatch console speakers) by selectively "listening" to active TDM network channels. In the preferred embodiment, audio is routed unidirectionally on an "as needed" basis (e.g., in response to radio transceiver "keys" and "unkeys"), and audio routing pathways may change dynamically during an on-going call.

45 Claims, 6 Drawing Sheets

MULTI-SITE ARCHITECTURE

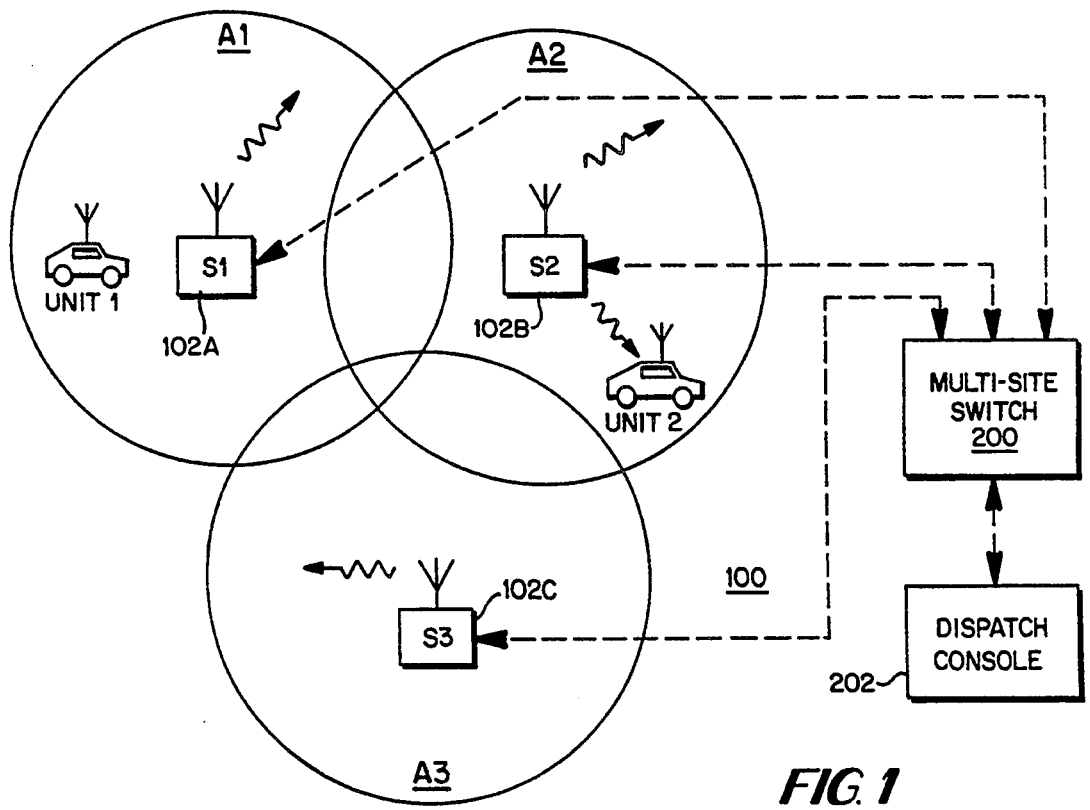
FIG. 1
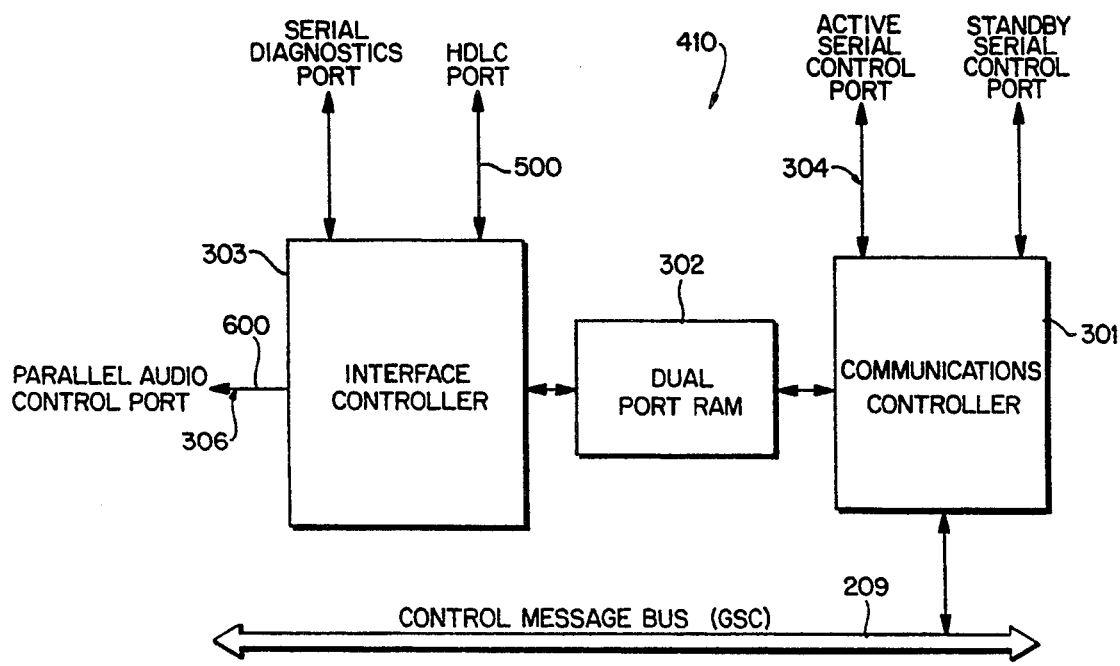
FIG. 4  SWITCH CONTROLLER CARD ARCHITECTURE

FIG. 2 MULTI-SITE ARCHITECTURE

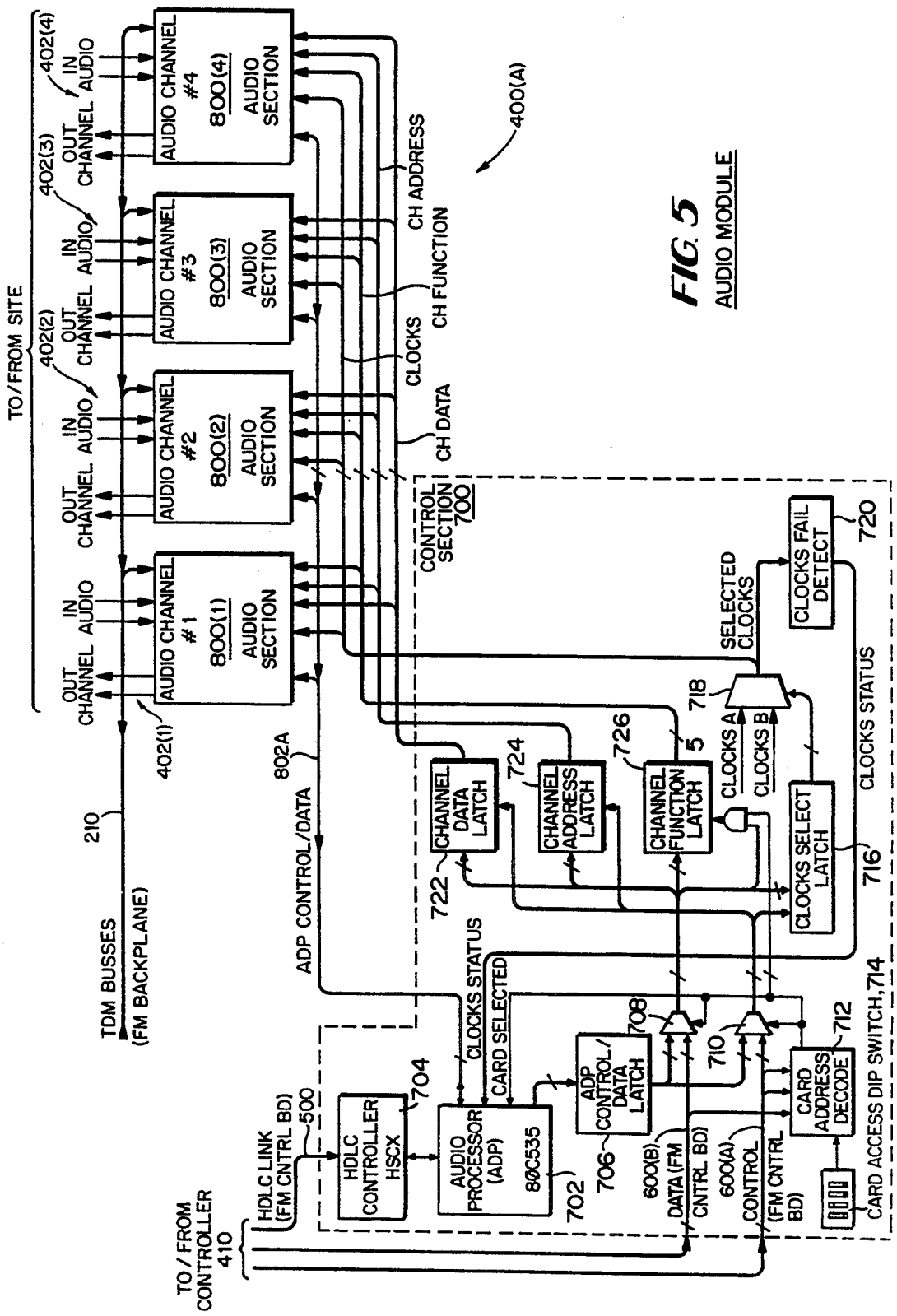

1

AUDIO ROUTING WITHIN TRUNKED RADIO FREQUENCY MULTISITE SWITCH

CROSS-REFERENCES TO RELATED APPLICATIONS

This application is related to the following copending commonly assigned U.S. patent applications:

Application Ser. No. 07/658,799 filed Feb. 22, 1991 (Atty. Dkt. No. 46-188, Client Ref. No. 45-MR-655) now abandoned, which is a continuation-in-part application to Ser. No. 07/573,977 entitled "Distributed Multisite Coordination System" filed on Aug. 28, 1990 in the name of James L. Teel, Jr., now abandoned.

Application Ser. No. 07/658,843, filed Feb. 22, 1991, entitled "Dynamic Address Allocation Within RF Trunking Multisite Switch" U.S. Pat. No. 5,726,442 (Atty. Dkt. No. 46-189, Client Ref. No. 45-MR-635).

Application Ser. No. 07/658,640, filed Feb. 22, 1991, entitled "Message Bus Slot Update/Idle Control In RF Trunking Multisite Switch" (Atty. Dkt. No. 46-190, Client Ref. No. 45-MR-646) now U.S. Pat. No. 5,253,253.

Application Ser. No. 07/658,637, filed Feb. 22, 1991, entitled "Protocol Between Console and RF Trunking System" (Atty. Dkt. No. 46-191, Client Ref. No. 45-MR-649) U.S. Pat. No. 5,200,954.

Application Ser. No. 07/658,611, filed Feb. 22, 1991, entitled "Data Protocol and Monitoring System for RF Trunking Multisite Switch Global Ser. Channel" (Atty. Dkt. No. 46-192, Client Ref. No. 45-MR-650) U.S. Pat. No. 5,287,354.

Application Ser. No. 07/658,798, filed Feb. 22, 1991, entitled "Controller Architecture For RF Trunking Distributed Multisite Switch" (Atty. Dkt. No. 46-180, Client Ref. No. 45-MR-647) U.S. Pat. No. 5,239,538.

Application Ser. No. 07/658,844, filed Feb. 22, 1991 entitled "Distributed Multisite Switch Architecture" (Atty. Dkt. No. 46-418).

The disclosure of each of these related copending applications is incorporated by reference.

FIELD OF THE INVENTION

The present invention relates to trunked radio frequency (RF) communications systems, and more particularly to digitally trunked switching networks for multiple site ("multi-site") RF communications systems. Even more specifically, the present invention relates to audio signal routing within a multisite trunked radio frequency (RF) communications systems, and to a distributed switch that efficiently and rapidly routes command and audio signals between RF transmitter sites of a multisite trunked radio repeater system.

BACKGROUND AND SUMMARY OF THE INVENTION

Trunked RF repeater systems have become a mainstay of modern RF communications systems used, for example, by public service organizations (e.g., governmental entities such as counties, fire departments, police departments, etc.). Such RF repeater systems permit a relatively limited number of RF communications channels to be shared by a large number of users—while providing relative privacy to any particular RF communication (conversation). As is well known, typical state-of-the-art RF repeater systems are "digitally trunked"—e.g., they use digital signals conveyed over the RF channels (in conjunction with digital control elements connected in the system) to accomplish "trunking" (time-sharing) of the limited number of RF channels among a large number of users.

Briefly, such digitally trunked RF communications systems include a "control" RF channel and several (possibly many) "working" RF channels. The working channels are used to carry actual communications traffic (e.g., analog FM, digitized voice, digital data, etc.). The RF control channel is used to carry digital control signals between the repeater sites and user RF transceivers in the field. When a user's transceiver is not actively engaged in a conversation, it monitors the control channel for "outbound" digital control messages directed to it. User depression of a push-to-talk (PTT) switch results in a digital channel request message requesting a working channel (and specifying one or a group of callees) to be transmitted "inbound" over the RF control channel to the repeater site. The repeater site (and associated trunking system) receives and processes the channel request message.

Assuming a working channel is available for use by the requesting user, the repeater site generates and transmits a responsive "outbound" channel assignment digital message over the RF control channel (this message has the effect of temporarily assigning the available working channel for use by the requesting user transceiver and other callee user transceivers specified by the channel request message). The channel assignment message automatically directs the requesting (calling) user transceiver (and callee user transceivers) to the available RF working channel for a communications exchange.

When the communications exchange terminates, the user transceivers "release" the temporarily assigned working channel and return to monitoring the RF control channel. The working channel is thus available for reassignment to the same or different user transceivers via further messages conveyed over the RF control channel.

Single-site trunked RF repeater systems may have an effective coverage area of tens of square miles. It is possible to provide one or more satellite receiving stations (and a single high power transmitting site) if a somewhat larger coverage area is desired. However, some governmental entities and other public service trunking system users may require an RF communications coverage area of hundreds of square miles. In order to provide such very large coverage areas it is necessary to provide multiple RF repeater (transmitting) sites—and to somehow automatically coordinate all such sites so that a user radio transceiver located anywhere in the system coverage area may efficiently communicate in a trunked manner with other user radio transceivers located anywhere in the system coverage area.

FIG. 1 is a schematic diagram of a simplified exemplary multiple-site trunked radio repeater system having three radio repeater (transmitting/receiving) sites S1, S2, and S3 providing communications to geographic areas A1, A2, and A3, respectively. Mobile or portable transceivers within area A1 transmit signals to and receive signals from site S1; transceivers within area A2 transmit signals to and receive signals transmitted by site S2; and transceivers within area A3 transmit signals to and receive signals transmitted by site S3. Each repeater site S1, S2, S3 includes a set of repeating transceivers operating on a control channel and plural RF working channels. Each site may typically have a central site controller (e.g., a digital computer) that acts as a central point for communications in the site, and is capable of functioning relatively autonomously if all participants of a call are located within its associated coverage area.

To enable communications from one area to another, however, some mechanism (e.g., a switching network) must be provided to establish control and audio signal pathways between repeaters of different sites. Moreover, such pathways must be set up at the beginning of each call, and taken down at the end of each call. Unlike the situation in a cellular radiotelephone or land-based telephone environment, trunked radio system calls may be relatively short (e.g., in some cases, as short as a second or two in duration). During an emergency or other period of great activity, the system may be required to handle hundreds of such calls in a very short time period. For this to occur, it is necessary to efficiently and rapidly route audio signals between the elements (i.e., RF transmitter/receiver decks) related to any arbitrary channel of, for example, site S1 and the elements related to any arbitrary channel of site S2 (and also to the elements of any arbitrary channel of site S3) to permit user transceivers in coverage areas A1 and A2 (and A3) to communicate with one another.

Of course, telephone digital switch equipment providing extensive audio routing possibilities has been available for many years. Moreover, trunked radio system manufacturers have also for at least several years offered trunked switches that provided audio (and digital control) signal routing within the context of a trunked radio communications system. As one example, Motorola's Centracom II Plus trunked switch provides digital call routing between RF repeater stations of a single site and associated dispatch consoles. See also prior issued U.S. Pat. No. 4,268,722 which issued on May 19, 1981.

The assignee of the subject application, Ericsson-General Electric (EGE), has for the last few years offered "multi-site" trunked RF communications systems to its customers. Such multi-site systems provide multiple (spatially separated) RF repeater "sites" of the type shown in FIG. 1 in order to cover a large geographical area. A switching network (commonly referred to as a "switch") used by EGE in the past in its multi-site system employed a centralized analog audio routing and mixing matrix manufactured by Console Systems Inc (CSI) in combination with a standard central equipment. telephone switch to provide the audio routing and conferencing capabilities required. This arrangement was found to be too noisy, inflexible, complicated, slow and expensive and also had reliability problems (for example, if the audio mixing matrix failed, the entire switch would cease to function). Moreover, the system was not expandable (e.g., to accommodate additional RF sites and/or channels).

Modern digital switch networks (e.g., of the type used in telephone central equipment and, more recently in cellular radiotelephone switches) typically use a time-division-multiplexed ("TDM") bus as a common "highway" providing multiple time-shared channels for routing digitized audio signals between nodes. To carry the "highway" analogy a bit further, by temporarily creating "entrance/exit ramps" between the TDM bus and nodes that need to have audio signals routed therebetween, the "highway" can be used to carry a high volume of "traffic" between any two (or more) arbitrary nodes. Assume Node A and Node B need to have a bidirectional audio signal pathway temporarily established between them. Node A is assigned a time "slot" (channel) on the TDM bus, and node B is also assigned a (different) TDM time slot (channel). Node A converts the audio signals it needs to communicate to node B into digital (e.g., pulse code modulation—"PCM") signals and places these digital signals into its assigned time "slot" on the bus. Node B similarly converts the audio signals it needs to communicate to node A into digital signals and places these digital signals into its respective TDM bus time slot. To establish a "connection" between nodes A and B, it is only necessary to inform each node which bus "slot" the other node is placing its audio signals into. Each node can then "listen" to the other node's assigned bus slot—providing a bidirectional audio signal pathway between the two nodes.

EGE has also used, in a past multisite system, a TDM-based switch manufactured by CML. The CML switch included multiple TDM busses each operating at 64 KB/s and carrying $\mu$law PCM (digitized) audio signals. Audio processors (in the form of cards connected to a backplane) digitized the audio signals received from consoles and radio receivers and provided the digitized signals onto the TDM bus; and also removed digitized audio signals from the bus and converted them back to analog form. The CML system also included a centralized complicated multiple channel audio mixing matrix to route audio signals from any source to any destination as well as to provide conferencing (mixing) capability.

The audio mixing/routing problem is relatively complex. $N*N$ ($N^2$) possible routing connections are required to ensure that routing can be accomplished between any arbitrary two of N nodes. The problem is still more difficult, however, since the system must be capable of connecting multiple nodes together (e.g., to include multiple call participants located in different repeater coverage areas)—possibly also with one or more dispatch consoles (e.g., so that a dispatcher can listen in on multiple ongoing RF communications exchanges simultaneously and participate in any desired RF communications exchange). The audio routing must also be relatively rapid and have low pending routing request latency time—since calls are typically initiated and terminated very rapidly in a trunked radio repeater system.

Unfortunately, the CML centralized audio routing/mixing matrix described above is expensive, inflexible, unreliable, and relatively incapable of being expanded as the system it serves expands. Due to the nature of a matrix, the size of the matrix increases as the square of the increase in number of input lines to be mixed/routed (making expansion extremely expensive and, beyond a certain point, practically impossible). In addition, a mixing matrix is an extremely complicated piece of equipment that may be subject to reliability problems. Since failure of the matrix causes all audio routing to cease (thus rendering the entire switch non-operational), it was necessary to provide a redundant backup mixing matrix that could automatically be activated if the main matrix failed. Providing such a redundant matrix substantially increased the cost and complexity of the switch.

While prior trunked digital switches did provide audio routing between multiple arbitrary RF repeaters, much further improvement is possible. Lack of reliability and flexibility, high cost and undue complexity have been significant problems in prior art trunked RF switch designs. Moreover, prior art trunked RF switch audio processing circuitry and associated architecture has not been flexible enough to provide all of the features desired in a sophisticated multisite trunked radio system. It would be highly desirable to provide a trunked switch audio processing/routing system and associated architecture that is fault tolerant, can be easily maintained and serviced, is relatively inexpensive, and can be provided in a minimal yet easily (and inexpensively) expandable configuration to provide low latency time, high speed and high traffic carrying capability.

The present invention relates to distributed audio signal routing within a multisite trunked RF switch having a distributed architecture. The logical functions of such a switch are shared by various microprocessor operated nodes distributed throughout the switch. These nodes share the computational workload of the switch. The audio routing provided by the present invention is also performed in a distributed manner by audio processors associated with each audio source/destination—thereby completely eliminating the centralized audio mixing/routing matrix required in prior art trunked RF switches.

The present invention provides a highly advantageous distributed arrangement for routing audio from multiple sources to multiple destinations while at the same time minimizing overhead transactions needed for such audio routing.

In the preferred embodiment, each audio "source" in the multisite system (e.g., each repeater receiver) continually broadcasts audio signals over an audio bus (e.g., a TDM bus). Thus, the audio bus continually carries the audio signals from each of the sources (sufficient bus channel capacity is provided so that all audio sources may broadcast over the bus all the time). The problem of routing temporary audio pathways is thus simplified to selecting a subset of the audio signals carried by the bus to be routed to a particular audio destination (and to perform such selection in parallel in a distributed manner for each audio destination).

In the preferred embodiment, each audio destination continually monitors and processes all audio bus channels (a fast processing arrangement is provided such that the destinations always keep up with the bus traffic). In the preferred embodiment, a fast multiplier/summer is used to multiply each bus audio channel by an associated weighting factor, and to sum all such products together. Thus, selection of bus channels can be accomplished by simply specifying the weighting factors corresponding to the different bus audio channels.

The audio destination arrangement described above operates just as rapidly and efficiently when it is selecting any arbitrary (or all) bus audio channels as it does when it is selecting no bus audio channels. Hence, mixing of audio channels together is accomplished as a matter of course, and any number of bus audio channels can be mixed together efficiently and rapidly.

In somewhat more detail, the preferred embodiment distributed switch provides a digitized audio TDM (time division multiplexed) network that includes plural (e.g., 32) individual TDM busses. Frame and slot timings are synchronized across the busses, and define plural (e.g., 32) time slots per frame. In the presently preferred embodiment, this TDM bus arrangement provides a "highway" carrying many independent digitized audio channels simultaneously.

In the presently preferred exemplary embodiment of the present invention, audio processing circuitry associated with each channel of audio incoming from an RF site is preassigned a TDM bus number and bus slot (such preassignments may be made, for example, at power up time). This "incoming" or source audio processing circuitry continually outputs its digitized audio onto its preassigned TDM bus during its preassigned bus slot. Thus, no ongoing switching or routing of incoming calls onto the audio TDM network is necessary (all incoming calls are always "routed" onto the TDM bus).

Audio signal routing occurs—in a distributed manner—at the "outgoing" (destination) end of the audio connections in the preferred embodiment switch (e.g., at audio processing circuitry coupled to an RF transmitter or console "select" speaker). For example, in the preferred embodiment, audio processing circuitry associated with (and dedicated to) each RF transmitting "channel" is provided. If the associated RF channel is to be involved in a communication, this audio processing circuitry "listens" to selected (specified) digitized audio signals carried on the TDM network, converts those signals to analog audio signals, and provides the analog audio signals to the RF transmitter for transmission over an associated RF link. As part of "setting up" a call for routing through the preferred embodiment switch, a digital message is sent to such destination audio processing circuitry (via an associated controller) specifying which TDM buss(es)/bus slot(s) it is to listen to, convert to analog form, and provide to its associated RF transmitter.

As described above, in the preferred embodiment such audio processing circuitry is capable of mixing together any (or all) of the audio channels carried on the TDM bus. There is thus no need for any centralized audio mixing matrix in the preferred embodiment. Each audio destination on the audio TDM network can mix together audio signals from any/all of the audio sources coupled to the TDM network. Moreover, such mixing is performed in a distributed parallel processing manner for each of the RF channels that are to be involved in the call. Such call routing can be activated extremely rapidly (thus reducing latency time), and is also highly reliable (since failure of an entire audio processor merely results in failure of audio routing with respect to a small number of RF channels).

The distributed audio routing architecture provided by the multisite switch of the present invention thus has several advantages over prior art trunked switch designs. For example, the distributed audio routing arrangement safeguards against catastrophic failures of the switch or of all communications from one RF system to another. Mobile units in the area serviced by a failed node may not be able to call a unit in another area or receive calls from another area, but all other audio routing continues in an unaffected manner.

The distributed network multisite switch provided by the present invention also has a much faster response time than comparable central architecture multisite systems. The distributed network audio routing of the present invention provides parallel processing by sharing the computational task between several processors—and thus offers significant speed increases as compared with prior art systems.

The distributed audio routing arrangement provided by the present invention is also much less costly, much more easily expandable, and less complicated than prior art trunked repeater system centralized audio routing arrangements. The cost of plural individual audio routing processors/modules may be less than the cost of a centralized mixing facility. Moreover, a distributed network switch can be expanded simply by adding further modules. In contrast, to expand the capacity of a centralized mixer may require replacing the entire audio switching network with a larger unit.

The present invention also provides a unique node architecture in which digital trunking signal handling capabilities are integrated with audio signal routing functions. In the preferred embodiment, each node of a multisite network switch is supported by modular switch controllers and associated audio processors. These audio processor modules all have the same architecture and are interchangeable with one another in the preferred embodiment. The same controller modules and audio processor modules can be used in all nodes (e.g., console nodes and RF repeater nodes alike). The multisite node architecture provides for interchangeable node modules that can be used in any node in the switch. The multisite switch can thus be easily serviced in the field by replacing modules. The service person need only stock a few types of modules to replace any node in the switch. The service technician no longer must stock a variety of components to service the switch or review voluminous manuals about the circuitry in each of the various nodes. Similarly, a uniform node architecture reduces the complexity and costs of manufacturing.

The architecture of the node provided by the present invention includes a single controller module (preferably with a backup redundant controller module to ensure functionality in case of failure) supporting a plurality of audio modules. The controller modules and audio modules may take the form of printed circuit boards connected to a common backplane. The audio modules each process audio for several (e.g., four) bidirectional audio channels. Thus, one controller board supports many (e.g., sixteen) audio/data channels. The architecture of the node and its operation are specifically designed to enable a single controller board to handle a large number of audio boards and channels.

BRIEF DESCRIPTION OF THE DRAWINGS

These and other features and advantages of the present invention will become better and more completely understood by referring to the following detailed description of presently preferred exemplary embodiments in conjunction with the sheets of FIGURES, of which:

FIG. 1 is a schematic illustration of an exemplary "multi-site" trunked RF communications system;

FIG. 4 is a general block diagram of an exemplary architecture of the controller portion of the node shown in the FIG. 3;

FIG. 5 is a more detailed block diagram of an exemplary audio module shown in FIG. 3;

DETAILED DESCRIPTION OF PRESENTLY PREFERRED EXEMPLARY EMBODIMENTS

Figure 2:
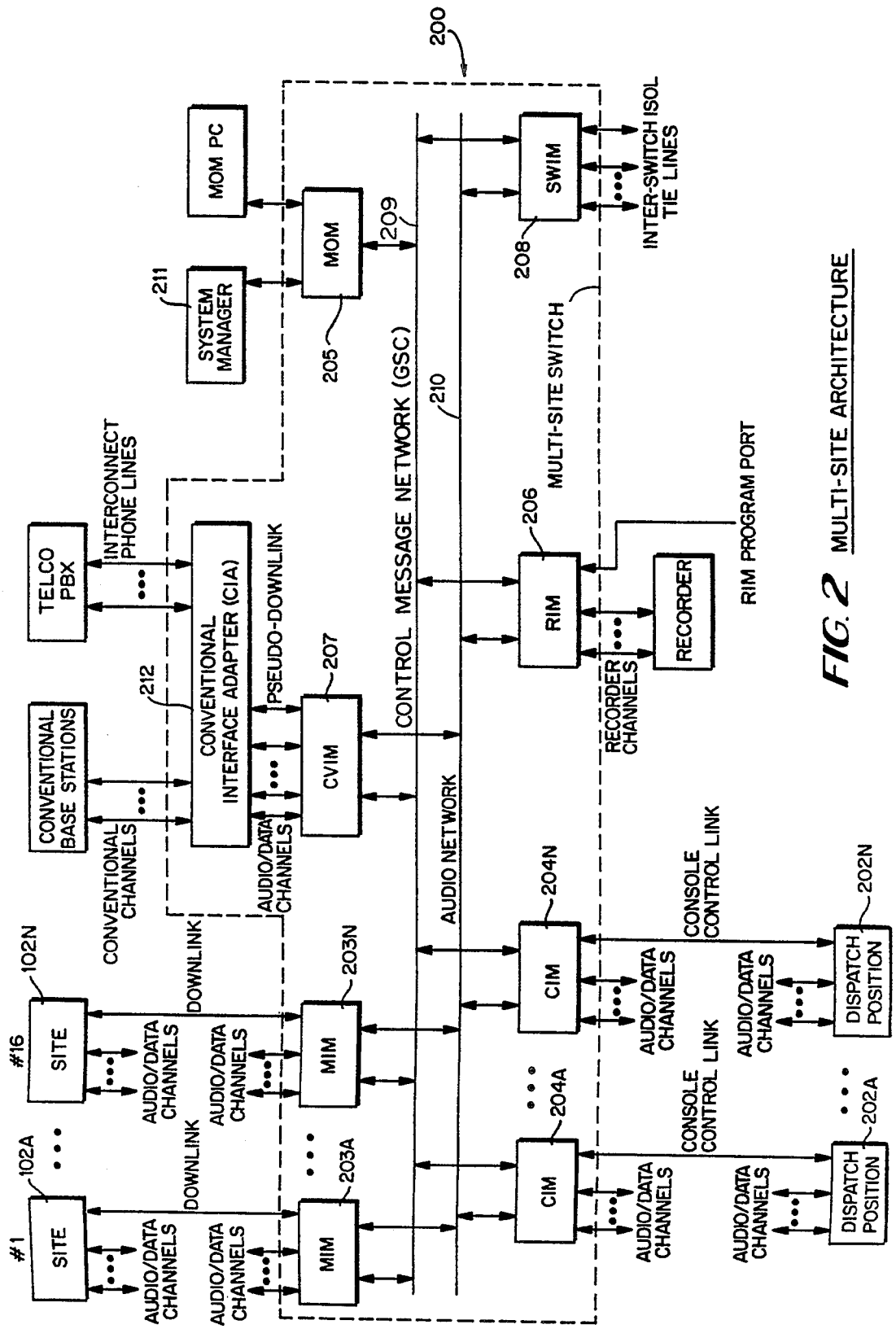
FIG. 2 is a schematic of an exemplary architecture for a distributed digitally trunked radio frequency communications system multisite switching network ("switch")

An exemplary trunked radio repeater system 100 in accordance with the invention is generally depicted in FIG. 1. Individual remote radio frequency (RF) transceiving units (e.g., mobile or portable radio transceivers) communicate with each other through shared radio repeaters that are part of the trunked repeater system 100. The exemplary system 100 includes several RF transceiver (repeater) sites 102 and one or more dispatch consoles 202. Each site 102 includes plural RF transceivers (repeaters) that transmit and receive signals over a certain area via full duplex RF channels. For example, site S1 transceives over area A1. Remote RF transceivers in the field (e.g., mobile or portable RF units) can communicate with units within their own area (and also, via multisite switch 200 and other sites 102, with units in other areas). The remote units also can communicate with the dispatcher consoles 202 and vice versa.

Each site 102 is controlled by a site controller. The site controller is typically a centralized digital computer (although it may be a distributed processor) that controls the radio frequency data and audio traffic handled by the site. Each site controller also communicates with the multisite switch 200. The multisite switch 200 routes communications between sites and dispatch consoles, and allows a talker in one RF repeater site coverage area (e.g. A1 shown in FIG. 1) to communicate with a talker (listener) in another area (e.g. A2) and/or with a dispatcher manning dispatch console 202. In order to increase efficiency and traffic handling capabilities (channel utilization), the exemplary preferred multisite system preferably transmits signals only into those areas where the intended talkers/listeners are located. Moreover, in the exemplary multisite network environment, each site independently assigns a specific channel to a call in coordination with channel assignments made by other sites. Thus, a single call may involve repeater transceivers of several sites 102 (such repeater transceivers generally operating on different frequencies to avoid interference).

In the preferred multisite system 100, for example, the site controller (S1) receives a call from a mobile radio in coverage area A1 requesting a channel to communicate with a specific callee or group of callees. The caller requests the channel simply by pressing the push-to-talk (PTT) button on the microphone of his remote RF transceiver. This informs the site controller (e.g., via an "inbound" digital control message transmitted over the RF control channel) that a channel is needed. The site controller assigns a working channel to the call and instructs the caller's radio unit to switch from the control channel to the assigned working channel. This assigned working channel is thus ready to support communications within the area covered by the site.

In addition, the site controller sends a message indicating the channel assignment to the multisite network switch 200. The switch 200, in turn, sends a channel request to all other site controllers—and also takes care of routing audio signals such that an audio signal pathway is created between the RF repeater servicing the caller and the RF repeater(s) servicing the callee(s)

(additional audio signal pathways may also be provided such that one or more dispatch consoles 202 may become involved in the communication). Upon receiving a channel request, these "secondary" site controllers (they are "secondary" in the sense that they did not originate the call) may each assign an RF working channel to the call (e.g., if a callee designated by the caller's channel request message happens to be physically located within the coverage area serviced by the associated RF transceiving site). Meanwhile, the switch 200 has ensured that the caller's audio has been routed from the active RF receiver of site S1 to active transmitters of each of the other sites participating in the call.

As the call progresses (and depending upon the type of call), further RF transceiver operators involved in the call may begin and/or cease transmitting. Switch 200 responds to such additional transmissions by dynamically routing further audio pathways (and mixing audio where necessary) such that all RF transceivers involved in the call can hear the transmissions of all other RF transceivers involved in the call. Such additional audio routing and disconnection is performed in response to digital messages specifying "assign" or "unkey" conditions propagated by switch 200.

When the caller ends the call (or the call is otherwise terminated), the caller's site controller (or possibly the site controller of another site handling a user transmission that is part of the call) deassigns the assigned channel and notifies the network switch 200 that the call is over. The network switch 200 propagates an "end of call" (e.g., "channel drop") command to all other site controllers. The "end of call" command results in release by all sites participating in the call of all working channels assigned to the call, and also in the multisite switch breaking all of the audio signal routing pathways associated with the call.

FIG. 2 is a more detailed schematic diagram of the architecture of multi-site switch 200 provided by the presently preferred exemplary embodiment of this invention. The multisite switch communicates with each site controller 102 and dispatcher console 202. There are data and audio communication lines between the multisite switch and each site controller and dispatcher console.

The primary responsibility of the multisite switch is to establish and remove audio connections between sites and dispatch consoles. The multisite switch comprises a local area network of nodes. As shown in FIG. 2, the nodes are labelled corresponding to whether they interface with a site controller, dispatcher console or other system component. For example, MIMs 203 are nodes in the switch that interface with site controllers and CIMs 204 are nodes that interface with dispatcher consoles. There are other nodes such as a Monitor Module (MOM) 205, Recorder Interface Module (RIM) 206, Conventional Interface Module (CVIM) 207 and a Switch Interconnect Module (SWIM) 208. The MOM 205 is the interface for the system manager and the MOM PC (personal computer) that have supervisory responsibility for the switch and overall radio system.

Each node in the multisite switch is supported by a microprocessor controlled controller module. All of the modules for the MIMs, CIMs, CVIM, MOM, RIM and SWIM have the same hardware and are interchangeable. The modules are said to have different personalities to indicate that they are assigned to, for example, a site controller or a dispatcher console (dispatch position). Each module can be easily configured to be a MIM, CIM, etc., by setting a few switches, and are thus truly interchangeable.

The nodes of the switch are each connected to a digital message bus 209 and a digital audio (TDM) network 210. The message bus 209 is shown in FIG. 2 as a message network using a conventional GSC digital messaging protocol as implemented by the Intel 80C152 Global Serial Channel (GSC) microprocessor. Such a GSC microprocessor is used as the communications controller in the controller module in each node. The message bus 209 is a high speed data bus that interconnects the interface processors in the controller of each node.

The audio bus 210 comprises 32 time division multiplexed buses in the preferred embodiment. Each bus contains 32 slots that each carry a single audio channel. A maximum of 1024 audio slots may be routed through the switch (32 buses $\times$ 32 slots), although some of the slots are used for other purposes (e.g., signalling). In the preferred embodiment, 240 channels of digitized audio are carried by audio TDM network 210.

Figure 3:
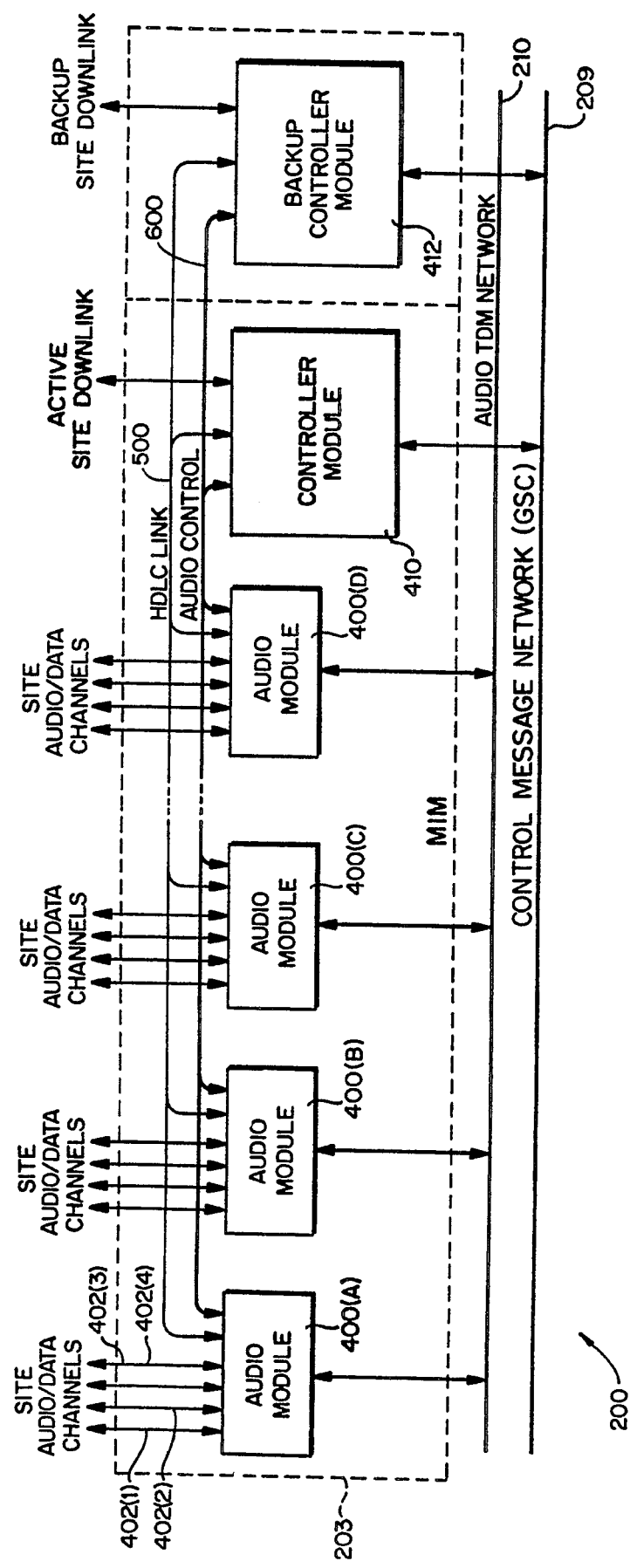
FIG. 3 is a detailed block diagram of a single exemplary node (providing multiple audio sources/destinations) shown in FIG. 2.

FIG. 3 is a high level block diagram of a single (multiple audio channel) exemplary MIM 203 provided by the presently preferred exemplary embodiment of this invention (in the preferred embodiment, the architecture of the CVIM, MIM, SMIM, RIM and CIM is also as shown in FIG. 3). As mentioned above, the "highway" used to communicate signals between switch nodes includes an audio time-division-multiplexed TDM network 210 and a message network ("GSC") 209. Both of these pathways convey digital signals between nodes. The TDM network 210 includes plural (e.g., 32) individual TDM busses, each bus providing multiple time-division multiplexed time "slots" that can be flexibly assigned. The message network 209 is used to carry control information in digital form between different parts of the switch. MIM 203 is thus connected to the message network 209. Since the MIM 203 typically services multiple RF channels and/or dispatch consoles, it provides multiple audio source/destinations each of which are connected independently to the audio TDM network 210.

MIM 203 in the preferred embodiment includes a controller module 410, a backup controller module 412, and plural (preferably one to eight) audio modules 400. Each of audio modules 400 in the preferred embodiment is connected to a maximum of four RF repeaters of an RF trunking site (or console audio channels in the case of a CIM) via a bidirectional audio link—and thus provides four distinct (bidirectional) audio source/destination pairs. For example, audio module 400(A) includes bidirectional audio links 402(1)-402(4) serving associated first through fourth trunked RF repeater site "channels" (i.e., RF transceiving/repeating decks associated with particular trunked RF channels). The audio modules 400 act as source gateways ("entrance/exit ramps") which convert audio signals incoming from the trunked repeater sites into digitized audio signals (PCM) and place the digitized audio signals onto the audio TDM network 210. These same audio modules 400 act as audio destinations by taking selected signals from the audio TDM network 210, converting them from digital into analog form, and providing the resulting analog signals to the RF repeater site "channels" for transmission via RF links.

The controller module 410 communicates with each of the four audio modules 400 via a common HDLC link 500 and an audio control link 600. The HDLC link 500 carries 360 Kbit serial data using HDLC protocol between the controller 410 and the audio modules 400. This HDLC link 500 is used in the preferred embodiment to, for example, carry fault indications and messages relating to RF "channel" (i.e., channel hardware) status between the audio modules 400 and the controller module 200 (additional general purpose I/O links not shown may be provided between the RF site and the audio modules to convey digital alarm and status messages if desired). Audio control link 600 permits the controller module 200 to set low-level parameters (e.g., level adjustment, TDM slot assignment, etc.) within each audio module 400 (e.g., without having to obtain the cooperation of a processor installed on-board each of the audio modules).

FIG. 4 shows a block diagram of an exemplary architecture for controller 410. This diagram is applicable to all of the nodes of the switch except for the conventional interface adapter (CIA). Each controller 410 includes a communications controller 301, a dual-port random-access-memory (RAM) 302 and an interface processor 303.

The communications controller 301 is a message router in the preferred embodiment. It routes messages between the control message bus 209 and the interface processor 303 (the dual-port RAM 302 is used to communicate between the communications controller and the interface controller 303). In the present embodiment, the communications controller 303 is an Intel 80C152 GSC microprocessor. The communications controller 301 is coupled to the GSC message bus 209. This controller 301 places messages onto the bus and receives messages from the bus. Messages received from the site controller over the serial port 304 are translated into a format usable by the multisite switch. The communications controller also translates switch messages into a format that the site controller understands.

The interface processor 303 performs substantially all logical functions for the MIM/CIM 203. In effect, the interface processor is the intelligence for the MIM 203. Interface processor 303 in this embodiment is an Intel 80C186 microprocessor. The interface processor 303 assigns TDM network channels to RF transceivers by controlling the audio modules 400 in the node via the parallel audio control bus 600. The interface processor 303 for each MIM/CIM 203 assigns slots for audio routing purposes, connects audio slots to the site controller or dispatcher console to establish a communications link, and terminates slot assignments (note that each MIM is preassigned a set of TDM bus slots for outputting audio signals onto, and these slots are not assigned and de-assigned during the course of normal call routing). Since all MIMs and CIMs perform these functions, they must continually inform each other and the other nodes of their slots assignments. Accordingly, the MIMs and CIMs send messages regarding slot assignments, slot updates and slot idles over the message network 209 to other nodes.

The communications controller 301 for each MIM 203 initially processes all of the messages on the message network. Slot assignments are forwarded to the interface processor 303 through the dual-port RAM. Redundant slot update/slot idle messages are not forwarded to the interface processor by the communications controller. Messages regarding slot updates or idle slots are processed by the communications controller 301 by referring to a slot bit map (database) located and maintained in the dual-port RAM storage 302. By referring to the slot bit map, the communications controller 301 determines whether the slot status message conveys redundant information already known to the node, or if the slot status message conveys new information about the slot. Update messages are sent periodically by MIMs 203 hosting calls to confirm, to the other MIMs 203, the active status of a slot. When a host MIM terminates a call, it sends a slot assignment and/or idle message to the other nodes. The primary MIM also periodically resends idle messages until the slot is reassigned to another call. Thus, all nodes are continually informed of the status of all slots that have been assigned at least once.

FIG. 5 is a detailed schematic block diagram of an exemplary audio module 400 shown in FIG. 3. Audio module 400 includes plural (four in the specific preferred embodiment described) audio channel sections 800 and a control section 700. Each of the four audio channel sections 800 is responsible for audio routing between a single bi-directional audio link 402 (e.g., the audio input and output of an RF repeater transceiver or a console "channel") and the audio TDM network 210. Thus, each audio channel section 800 has an audio "in" or source portion for receiving analog audio signals (e.g., from the audio output of an RF receiver located at a site); and an audio "out" or destination section for outputting analog audio signals (e.g., to the audio input of an associated RF transmitter located at the site). Audio links 402 may comprise direct wire connections, telephone twisted pairs, or channels on a T1 microwave link—depending, for example, upon the geographical location of the transceiving site relative to the switch.

Control section 700 provides control and clock signals to audio channel sections 800, and also provides an interface to controller module 410. The heart of the preferred embodiment control section 700 is a processor 702 (type 80C535) and associated HDLC controller/interface 704 (e.g., a type 82525 IC), a control/data (multiplexer selected) latch 706, a data multiplexer 708, and a control signal multiplexer 710. In the preferred embodiment, processor 702 and control module 410 provide overlapping (and in some cases, redundant) control capabilities. Controller module 410 and processor 802 communicate with one another via HDLC link 500 and HDLC controller/interface 704. In addition, control module 410 provides control and data signals via audio processor control bus 600 (which in the preferred embodiment includes an 8-bit parallel control bus 600A and an 8-bit parallel data bus 600B).

Control registers 722-726 provide control signals to audio sections 800. In the preferred embodiment, these control registers include a channel data latch 722, a channel address latch 724, and a channel function latch 726. The channel address latch 724 in the preferred embodiment stores a four-bit address field wherein each of the four bits corresponds to an associated audio channel section 700. Thus, the channel address latch 724 is used to select (via a CH ADDRESS bus) which of the four audio channel sections 800(1)-800(4) is to perform the function specified by the control signals latched in the channel function latch 726. Channel function latch 726 provides parallel control signals to audio sections 800(1)-800(4) via a CH FUNCTION bus, each of the control signals specifying a different function to be performed by the audio processor section 800 specified by the contents of the channel address latch 724. Channel data latch 722 stores an 8-bit data word that is provided to each of audio sections 800 via a CH DATA bus. The significance and usage of this data word provided by the channel data latch depends on the function selected by the contents of channel function latch 726.

Controller 410 can write to control registers 722, 724 and 726 within control section 700 by asserting the address of the audio module 400 onto address/data bus 600B and by asserting additional appropriate control signals onto the control bus 600A. The address of the audio module 400 is set by a card address DIP switch 714 in the preferred embodiment, and the address signals are decoded by card address decode logic 712 (preferably a digital comparator and associated gates and flip flop for synchronization). When controller 410 asserts the address set by DIP switch 714 onto address-/data bus 600B, multiplexers 708, 710 are controlled to select the controller module control and data buses 600 for output to control registers 722-726.

The signals generated on the controller module control bus 600A select the type of programming operation that the controller 410 is to perform on the audio module 400. For example, in the preferred embodiment, the selection of which of registers 722-726 is to be loaded with the signals carried by address/data bus 600B is controlled by control lines of control bus 600A. The following is an exemplary description of bit significances for control words asserted by the controller 410 on the control bus 600A:

ENBL 0: DATA latch enable
ENBL1: not used
ENBL2: CHANNEL FUNCTION latch enable
ENBL3: Write Codec enable
ENBL4: Clock select enable
ENBL5: not used
ENBL6: clear line
ENBL7: CHANNEL ADDRESS latch enable As mentioned above, the contents of channel function latch 726 cause control signals to be generated that directly control an audio section 800 addressed by channel address latch 724 to perform desired functions. In the preferred embodiment, the CH FUNCTION bus output provided by channel function latch 726 is five bits wide. The functional significance of these five signals CF0-CF5 with respect to audio sections 800 is set forth below:

CF0: select type of digitized audio converting (e.g., select between μlaw or Alaw, or between μlaw and no conversion);
CF1: Bus Number/Slot Write Enable (the contents of channel data latch 722 are to be loaded into the addressed audio section and used to designate a TDM bus number/slot );
CF2: Weighting Table Write enable;
CF3: Write Codec Channel Enable
CF4: Activate 2175 Hz Tone Generator;
CF5: Enable auxilliary PTT relay (e.g., to light an indicator each time PTT is present).

During times when controller 410 is not addressing audio module 400, multiplexers 708, 710 select the output of an audio processor control/data latch 706 for output to the control registers 722-726. In this way, local on-board processor 702 is capable of controlling audio sections 800 to perform any/all of the functions that controller 410 can cause them to perform. In addition, the local processor 702 is able to sample the digitized audio outputs generated by the audio channel sections 800. Local on-board processor 702 is provided principally for diagnostic purposes. Control functions which processor 702 performs under program control may, for example, exercise or test the audio channel sections 800. Such diagnostics may be performed in response to commands received by the processor 702 from controller 410 over HDLC link 500.

In addition to providing redundant or secondary control/addressing of control latches 722-726, processor 802 performs additional routine control functions associated with audio sections 800 (e.g., generating chip select and read/write signals, illuminating status indicators, controlling the levels set by electronic potentiometers and selectively bypassing same, sensing failure modes such as clock generator failure, etc.). Such routine control signals are provided by processor 702 to audio sections 800 via signal lines 802A.

Clock select latch 716 and multiplexer 718 are used in the preferred embodiment to select between redundant sets of master clocking signals common to the entire switch 200 in response to the clock select enable bit of control bus 600A (master clocking of the audio sections 800 is necessary to ensure that each audio section is synchronized with the TDM bus). Mux 718 performs such selection between clocks under control of a control signal outputted by MUX 710. The selected clocking signals are provided to the audio sections 800 via the "clocks" line. A "clocks fail" detection block 720 permits processor 802 to detect whether the master clocking signals are reaching the audio sections 800.

Figure 6:
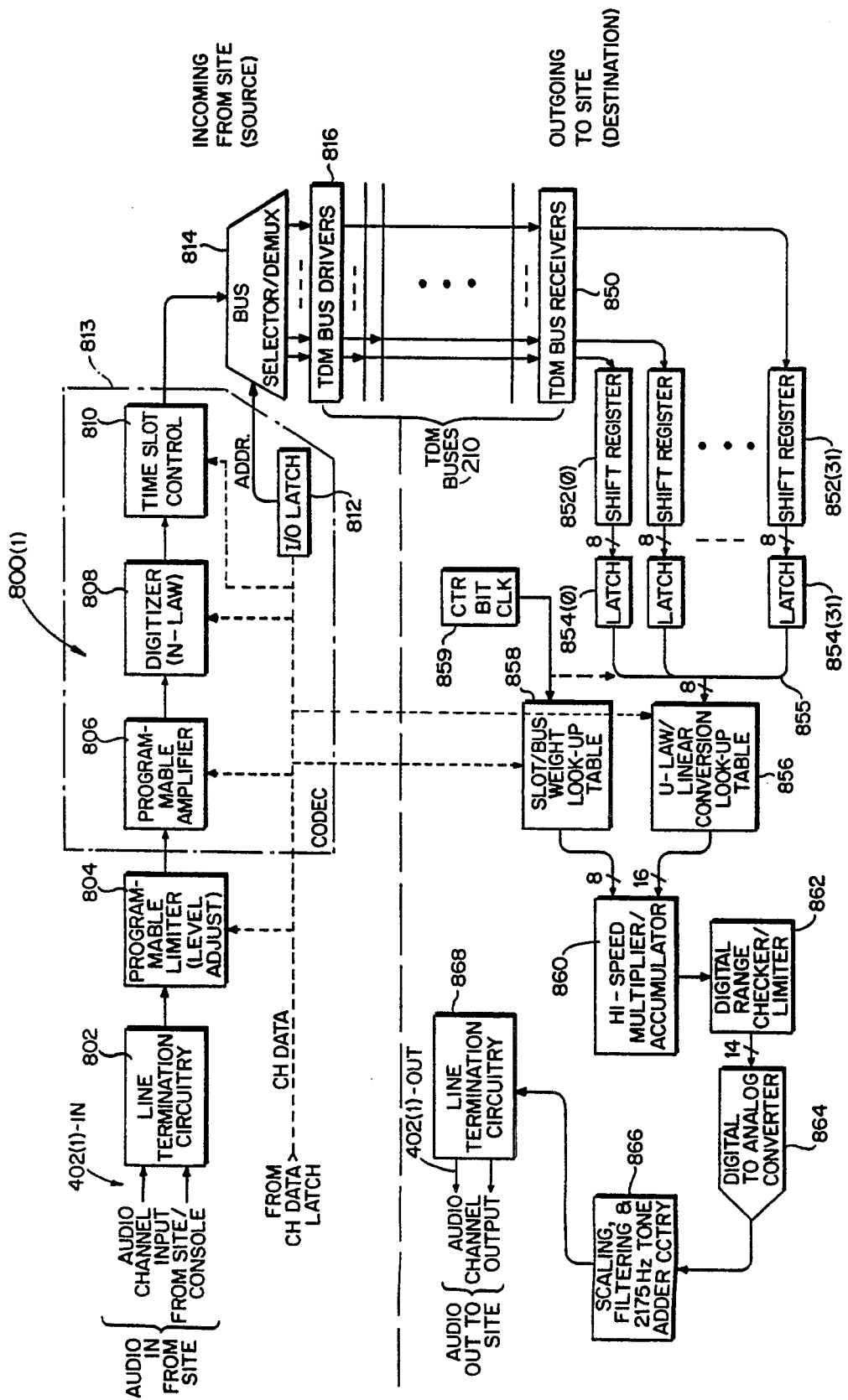
FIG. 6 is a detailed schematic diagram of the circuitry associated with an exemplary audio channel section shown in FIG. 5.

FIG. 6 is a detailed schematic diagram of an exemplary audio section 800 provided by the presently preferred embodiment of this invention. Audio section 800 includes "incoming audio" (source) processing circuitry that processes and digitizes audio coming in from the RF site and places the digitized audio on the audio TDM network (this circuitry is shown above the dashed horizontal line of FIG. 6); and also includes "outgoing audio" (destination) processing circuitry that takes selected digitized audio signals from the audio TDM network, converts the digitized audio signals into analog signals, and sends the resulting audio signals to the RF site for transmission (this circuitry is shown below the FIG. 6 dashed horizontal line). The interface between the "source" and "destination" portions of audio section 800 is the audio TDM network 210 itself.

As mentioned above, the "source" portion of audio section 800 is preassigned a TDM bus number and bus slot (via controller 410 at time of power up), and continually broadcasts digitized audio signals over the TDM network (regardless of whether or not audio is coming in from the site RF receiver). In the preferred embodiment, this source portion includes a line termination circuit 802, a programmable limiter (level adjustment) block 804, a programmable amplifier 806, a digitizer 808, a time slot control block 810, an I/O latch 812, a bus selector/demultiplexer 814, and a TDM bus driver block 816.

In the preferred embodiment, a balanced pair (e.g., a telephone line) 402(1)-IN is used to carry audio signals from the RF repeater site to audio section 800. This balanced pair 402(1)-IN is coupled to conventional balanced line termination circuitry 802 (preferably including surge protectors to protect audio section 800 against spikes and transients). The line termination circuitry provides the resulting analog audio signal to a programmable level adjust block 804, which in the preferred embodiment takes the form of an electronic potentiometer which can be serially loaded by audio processor 702 with a data word specifying a programmable amount of attenuation (commands for such programmable attenuation adjustment may be communicated from controller 410 to audio processor 702 via HDLC link 804 if desired). The output of block 804 is provided to a compression amplifier/limiter 806 used to provide an audio signal of relatively uniform average high level (thus ensuring that all digitized audio signals carried by TDM network 210 have high S/N and also ensuring that the analog audio applied to the input of digitizer 808 does not exceed the dynamic range of the digitizer). In the preferred embodiment, it is possible for audio processor 702 to control compression amplifier 806 to be selectively bypassed.

In the preferred embodiment, the output of compression amplifier 806 is provided to the input of a conventional μlaw PCM codec/digitizer 808. The codec/digitizer 808 provides its output to demultiplexing network 814 for application (via a conventional buffer/bus driver 816) to TDM network 210. Controller 410 can write instructions to codec 808 via channel function latch 726 and channel address latch 724. A programmable I/O latch 812 controls which TDM bus the serialized codec 808 output is applied to by the demultiplexer 814. In the preferred embodiment, time slot control block 812 is implemented using a programmable codec device 813 that includes an internal latch specifying bus slot (timing) information. This internal latch is loaded with the output of the channel data latch 822 (via the CH DATA bus) at the time of system power up or reset, for example—thereby assigning a bus slot for exclusive use by the audio section 800.

Bus selector/demultiplexer 814 in the preferred embodiment comprises a conventional demultiplexing array which selects one of the various TDM busses in response to the contents of I/O latch 812 (preferably also loaded therein by controller 410 at time of power up or reset with a multibit word specifying one of the 32 TDM busses and one of 32 slots of audio TDM network 210). Only a single TDM bus driver 816 is required for each of audio sections 800, but in the preferred embodiment bus selector 814 and bus drivers 816 are shared among all four audio sections 800 (as are TDM bus receivers 850) in order to decrease component count, simplify circuit design and reduce the number of components connected directly to the TDM network 210.

Thus, the source portion of audio processor 800 continually (i.e., every frame) outputs digitized audio signals onto TDM network 210 (on a preassigned one of the TDM busses during a bus slot preassigned to it). This continual outputting occurs regardless of whether there is activity on the audio input link 402(1)-IN the preferred embodiment. Hence, all audio sections 800 of each MIM 203 and CIM 204 of the system are audio sources that are continually broadcasting digitized audio information over TDM network 210 to all other MIMs and all other CIMs. However, in the preferred embodiment no part of the system actually "listens" to any of these continually active audio channels until digital messages (i.e., slot assignment messages) are sent over message network 209 indicating that a call is active. Such slot assignment messages for active calls specify a TDM bus number/bus slot and also convey information (i.e., radio transceiver group information) that causes all MIMs and CIMs that need to be involved with a call to begin "listening" to the appropriate TDM bus slots, to convert the digitized audio signals contained in those slots into analog audio signals, and to provide the analog audio signals to an RF repeater or console assigned to handle the call (RF repeaters and associated RF working channels are also assigned in response to an initial such slot assignment message).

The "destination" portion of audio section 800 includes TDM bus receivers 850, a bank of shift registers 852 and associated latches 854, a (e.g., read only) μlaw-to-linear conversion lookup table, a (read/write) slot/bus weight lookup table 858, a high speed multiplier/accumulator 860, a digital range checker/limiter 862, a digital to analog converter (DAC) 864, additional scaling, filtering and tone generation circuitry 866, and a line termination circuit 868. In the preferred embodiment, TDM bus receivers 850 receive signals from all TDM busses. The outputs of this bank of bus receivers are applied to serial inputs of a bank of shift registers 852 and associated latches 854 (this arrangement of shift registers and latches is implemented in the preferred embodiment using a VLSI programmable ASIC chip). There is one shift register 852 and associated latch 854 for each of the individual TDM busses within TDM network 210. Shift registers 852 operate at the TDM bus timing bit rate, and function as serial-to-parallel converters that continually shift in a slot worth of PCM digitized audio and convert it to 8-bit wide parallel output format (in the preferred embodiment, each shift register 852 is 8-bits wide and thus can hold all PCM data bits for a particular bus slot).

Latches 854 are clocked at the TDM bus slot timing rate, and operate to latch the parallel output signals provided by shift registers 852 corresponding to a particular bus slot. Thus, at the conclusion of a TDM bus slot duration, each of latches 854 contains an 8-bit parallel word corresponding to the contents of a single slot of a single associated TDM bus. Latches 854 together provide, in parallel, the slot contents of all TDM busses for the last TDM bus slot.

The data latched by latches 854 is multiplexed in sequence to the address input of lookup table 856 at a bit clock rate that is a multiple of the TDM bus slot timing (for example, for 32 TDM busses the bit clock rate must be 32 times the TDM slot rate). Blocks 856–860 are all synchronized to operate at this rate. The parallel output of one latch 854 at a time is enabled onto a multiplexed address bus 855 (the multiplexing being performed under control of a counter 859 clocked at the bit clock rate described above). Thus, incrementing counter 859 from zero to a maximum value in the preferred embodiment will cause the TDM bus data corresponding to the following sequence of TDM bus number/bus slots be to applied to the address input of table 856:

---

TDM BUS (0), Slot (0);
TDM BUS (1), Slot (0);
TDM BUS (2), Slot (0);

.

.

.

TDM BUS (31), Slot (0);
TDM BUS (0), Slot (1);
TDM BUS (1), Slot (1);
TDM BUS (2), Slot (1);

.

.

.

TDM BUS (31), Slot (1);
TDM BUS (0), Slot (2);
TDM BUS (1), Slot (2);

.

.

.

-continued

TDM BUS (31), Slot (31).

The signals carried by multiplexed address bus 855 are used to address lookup table 856 (which in the preferred embodiment comprises a 512 by 16-bit ROM). Lookup table 856 performs a linearizing function ("LIN[]") in the preferred embodiment. More particularly, lookup table 856 stores conventional conversion data used to map a μlaw digitized representation applied to its address input into a linear digitized representation (the linear representation is used in the preferred embodiment to simplify the mathematical operations performed by multiplier/accumulator 860). In the preferred embodiment, controller 410 can select (via CHANNEL FUNCTION latch 726 bit CF0) a different mapping (e.g., A-law, as opposed to μlaw).

The "LIN" output of lookup table 856 is applied to one input of multiplier/accumulator 860 operating in synchronism with the bit clock (and thus with the multiplexed address bus 855). Another input of the multiplier/accumulator 860 receives an 8-bit weighting signal provided by the output of slot/bus weight lookup table 858. Lookup table 858 in the preferred embodiment comprises a 256×8 bit RAM addressed by the output of counter 859 (the address information provided by the counter encoding TDM bus number and TDM slot number). The address supplied to lookup table 858 thus specifies a particular location within the lookup table corresponding to a TDM bus number/slot combination.

Figure 7:
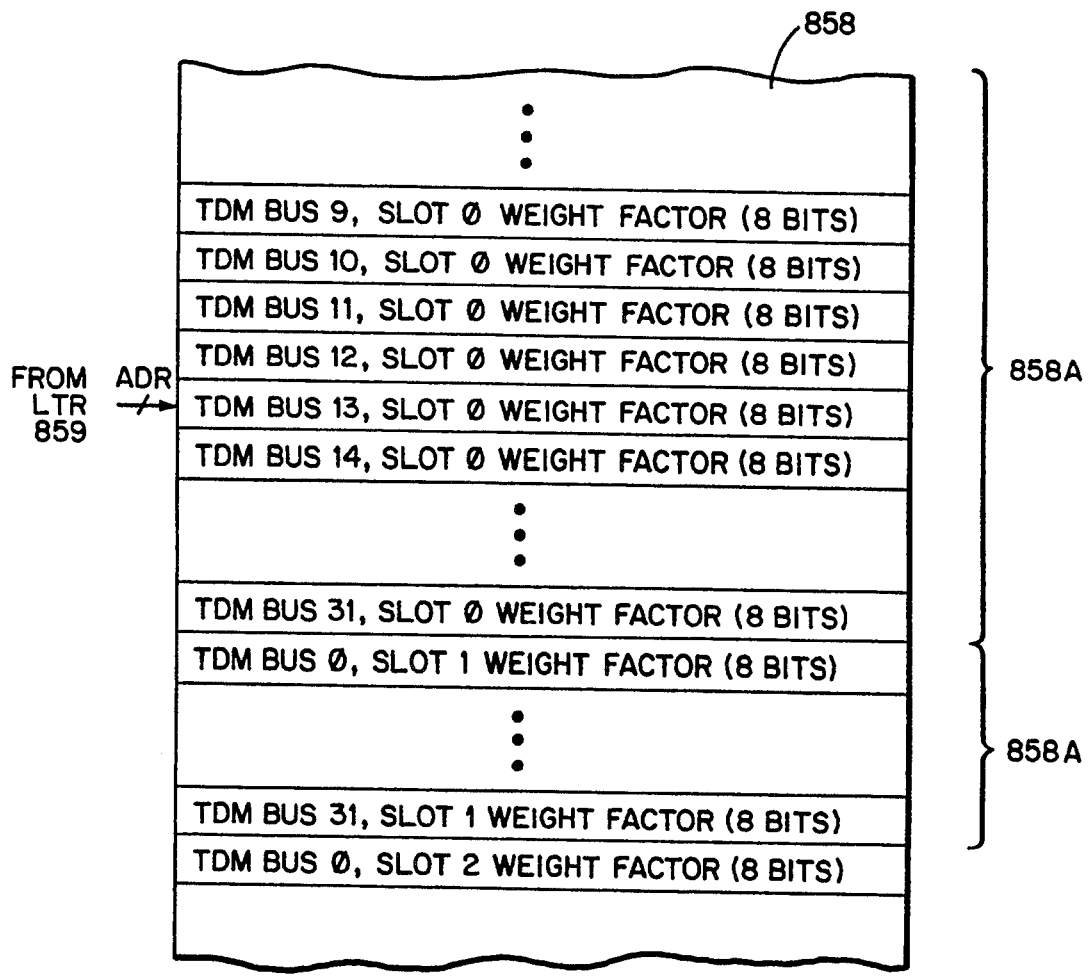
FIG. 7 is a schematic diagram of an exemplary memory map for the bus number/slot weighting table provided in the exemplary audio channel block shown in FIG. 6.

FIG. 7 is a schematic diagram of an exemplary memory map of memory 858. In the preferred embodiment, memory 858 includes individual memory locations uniquely corresponding to TDM network 210 bus number/slots (i.e., channels). These memory locations are most conveniently organized (with respect to the address lines from counter 859) such that the counter (as it is incremented at the bit clock rate) addresses a sequence of memory locations corresponding to the sequence of data provided by latches 854 over address bus 855. Thus, memory 858 stores blocks 858A of data corresponding to bus slots, each such block including individual memory locations corresponding to each of the individual TDM busses.

Addressing of memory 858 by counter 859 results in the following sequence of weighting factors to be outputted from table 858 (where each weighting factor is indicated by an ordered pair of TDM bus number, TDM slot number):

WF(0,0);
WF(1,0);
WF(2,0);
.
.
.
WF(31,0);
WF(0,1);
WF(1,1);
WF(2,1);
.
.
.
WF(31,1);
WF(0,2);
WF(1,2);

-continued

WF(31,31);

High-speed multiplier/accumulator 860 operates at the bit clock rate to multiply the sequences of outputs of tables 856, 858 together and to sum the products into an output register. Thus, high-speed multiplier/accumulator 860 performs the following "sum of products" calculation once for each TDM bus frame:

{LIN[TDM BUS (0), Slot (0)] * WF(0,0)} +
{LIN[TDM BUS (1), Slot (0)] * WF(1,0)} +
{LIN[TDM BUS (2), Slot (0)] * WF(2,0)} +
.
.
.
{LIN[TDM BUS (31), Slot (0)] * WF(31,0)} +
{LIN[TDM BUS (0), Slot (1)] * WF(0,1)} +
{LIN[TDM BUS (1), Slot (1)] * WF(1,1)} +
{LIN[TDM BUS (2), Slot (1)] * WF(2,1)} +
.
.
.
{LIN[TDM BUS (31), Slot (31)] * WF(31,31)}.

Thus, the values of weighting factors WF(0,0) ... WF(31,31) determine which TDM bus numbers/bus slots (i.e., PCM digitized audio channels carried by the TDM network) will contribute to the sum accumulated by multiplier/accumulator 860. When the repeater served by audio processor 800 is inactive, all of the weighting factors will have zero values and the output of multiplier/accumulator 860 will be zero. When the repeater served by audio processor 800 is active, one or more of the weighting factors (i.e., the weighting factors corresponding to the TDM bus number(s)/bus slot(s) to be routed to the repeater transmitter) are set by controller 410 to be non-zero. The manner in which controller 410 writes data into the locations of memory 858 to control which TDM bus number(s)/bus slot(s) are to be routed to the repeater audio channel output 402(1)-OUT will be described shortly.

Once per TDM bus frame, multiplier/accumulator 860 provides a summation output to the input of digital range checker/limiter 862. Range checker/limiter 862 comprises a further programmable ASIC that operates at the TDM bus slot rate to check the magnitude of the summation output and, if necessary, to substitute a predetermined maximum output value for any value exceeding the dynamic range of DAC 864. DAC 864 converts (at the TDM slot rate) the output of range checker/limiter 862 into an audio signal (14 bit precision is used in the preferred embodiment) and provides the analog output to scaling, filtering and tone generation block 866. Block 866 buffers and band-pass filters the output of DAC 864 and provides the filtered, scaled output to line termination circuit 868 for application to the associated RF repeater transmitter audio input via audio link 402(1)-OUT.

In addition, block 866 selectively generates and applies a 2175 Hz tone to the audio using conventional digital tone generation circuitry. This tone is generated in response to channel function latch bit CF4, and is used to control the repeater transmitter during operation in the "remote repeat" mode. While the RF site is also capable of operating in the "local repeat" mode (wherein the site controller directly controls the repeater transmitter), the "remote repeat" mode is used in the preferred embodiment multisite switch configuration to permit MIMs 203 to remotely control when their associated repeater transmitters are "on the air" and transmitting RF signals modulated with audio. Controller 410 controls whether or not block 866 applies such a "remote repeat" tone to audio channel output 868.

As mentioned above, controller 410 is responsible for writing weighting factors (WF) into slot/bus weight look-up table 858. In the preferred embodiment, a multiplexer (not shown) controllable by controller 410 (via channel function latch 826) selectively permits the controller to write data into locations of table 858 also specified by the controller. Generally, whenever controller 410 receives a slot assignment message over digital message bus 209 specifying a group that is active in its associated site, the controller writes a non-zero weighting factor into the location within table 858 corresponding to the TDM bus/bus slot specified by the slot assignment message. Similarly, whenever the controller 410 detects (via a "key" message transmitted to it via its associated site) that a transceiver within the site's coverage area has begun transmitting on a working channel, it writes a non-zero weighting factor into table 858 corresponding to the active audio section's own preassigned TDM bus number/bus slot (so as to provide a "loopback" and permit the repeater transceiver to repeat audio signals originating from its own coverage area). As the call progresses and transceivers in other site coverage areas begin and cease transmitting, the MIMs 203 associated with those sites will generate slot assignment messages (specifying assignment or unkey group type fields) that will cause controller 410 to add further non-zero entries to table 858 (or to overwrite previously written non-zero entries with zero values in the case of unkey and "channel drop" type slot assignment messages). Thus, as a given call progresses, new audio pathways are dynamically routed as needed (and previously established audio pathways that are no longer needed are dynamically disconnected) in response to RF mobile/portable transceiver keying and unkeying. When an ongoing call terminates (e.g., as indicated by "drop channel" message from the site), controller 410 "zeros" any/all non-zero entries corresponding to the group associated with the call (thus breaking all routed destination—but not source—audio pathways associated with the call).

In the preferred embodiment, two write cycles of the CH DATA bus are used by controller 410 to rewrite a location within memory 858. Once controller 410 writes appropriate address information into channel address latch 724 to select an appropriate audio section 800, controller 410 latches a bus number/bus slot value into channel data latch 722, and then writes an appropriate control word into channel function latch specifying that the contents of data latch 722 are to be latched by audio section 800 as a bus number/bus slot (e.g., this control word may specify the CF1 bit to be asserted). Controller 410 then causes data latch 722 to latch the new weighting factor value, and writes a further control word into the channel function latch (e.g., specifying CF2=1) to cause a write to memory 858. One of the ASICs described above passes the bus number/bus slot address through to the address inputs of memory 858, and also multiplexes the contents of channel data latch 722 onto the data input/output lines of the memory so it can be written into the memory in response to the memory write enable signal.

In the preferred embodiment, the controllers 410 of MIMs 203 write the same constant predetermined non-zero weighting factor into any/all active entries of table 858 (so that all non-zero weighting factors have the same magnitude in the preferred embodiment). This predetermined value is selected by software to minimize the amount of amplitude limiting performed by range checker 862 while still providing relatively high output levels, and is constant (although it may be changed by MOM 205 if necessary to adjust for line loss over link 402(1)-OUT). In the case of CIMs 204 serving consoles (these CIMs have the same node architecture as is shown in FIG. 4 for MIMs 203), the uniform weighting factors may be varied in magnitude in response to an console operator control to provide a volume control (for CIMs, the audio channel output 402(1)-OUT is provided to an audio amplifier and associated console "select" loudspeaker).

Console operators may typically wish to listen to many groups simultaneously over the same "select" loudspeaker. The same architecture described above is used to accomplish this result. In the case of CIMs 204, controller 410 may be programmed with a database containing multiple group numbers. Thus, each time a slot assignment message specifying one of the group numbers in the database is transmitted over message network 209, the CIM controller 410 writes a non-zero weighting factor WF into its associated table 858. However, generally unlike the weight lookup tables 858 of MIMs 203 (which typically will have only a few non-zero entries at any given time), CIM weight lookup tables may have many tens of non-zero entries to permit multiple TDM channels corresponding to multiple sites and multiple groups to be summed simultaneously for easy monitoring by the console operator.

The present invention has been described in connection with what are considered to be the most practical and preferred embodiment. However, the present invention is not to be limited to the disclosed embodiment, but on the contrary, is intended to cover various modifications and equivalent arrangements included within the spirit and scope of the appended claims.

What is claimed is:

1. In a digitally trunked radio frequency communications system, a distributed audio routing arrangement for routing audio signals between an audio source and any of plural audio destinations, said distributed audio routing arrangement comprising:

a time-division multiplexed digitized audio signal bus defining at least one time slot dedicated for use by said audio source;

said audio source being coupled to said audio signal bus, said audio source applying digitized audio signals to said audio bus dedicated time slot to thereby broadcast audio signals over said audio bus;

plural audio routing means, coupled between said audio bus and said plural audio destinations, for selecting said audio signals broadcasted by said audio source over said audio bus and for providing said signals to associated plural audio destinations; and a digital communications link conveying digital messages between said audio source and said plural audio routing means;

wherein said plural audio routing means operate using distributed control, wherein each of said audio routing means includes autonomous means for deciding whether. or not to select said signals applied by said audio source to said dedicated time slot and provide said selected audio signals to at least one of said plural audio destinations associated therewith based at least partially on information conveyed over said digital communications link.

2. An arrangement as in claim 1 wherein information is distributed via said digital communication link using a carrier-sense multiple-access (CSMA) communications protocol.

3. An arrangement as in claim 1 wherein said plural audio routing means each include mixing means for mixing plural audio signals carried by said audio bus.

4. An arrangement as in claim 1 wherein said plural audio routing means each include a lookup table storing weighting factors, said audio routing means selecting signals carried by said audio bus in response to weighting factors stored in said lookup table.

5. In a digitally trunked radio frequency communications multisite system of a type having at least one audio source and plural audio destinations, a method for routing audio signals between said audio source and any of plural audio destinations utilizing a distributed control arrangement, said method comprising the following steps:
(a) broadcasting audio signals from an audio over a time-division multiplexed (TDM) audio signal bus accessable to each of said plural destinations;
(b) communicating digital messages indicating audio source activity information to each of said plural audio destinations;
(c) deciding autonomously at each of said plural audio destinations, based at least in part on said audio source activity information, whether or not to receive and use said audio signals broadcasted by said audio source over said audio signal bus; and
(d) at each of said plural destinations, providing Or not providing said broadcasted audio signals to corresponding audio destinations based on the result of the deciding step (c).

6. A method as in claim 5 wherein said audio source is preassigned a particular audio bus time slot at time of system power up that is utilized during said broadcasting step.

7. A method as in claim 5 wherein said steps of autonomously deciding and providing audio signals from said audio bus to corresponding audio destinations allows coupling a single source to multiple destinations.

8. A distributed control audio routing arrangement for use in a digitally trunked radio frequency (RF) communications system of a type having a time-division multiplexed (TDM) audio bus carrying plural channels of digitized audio, said audio bus being coupled to plural audio destinations, said audio routing arrangement including for each said plural audio destinations:
bus receiving means coupled to said audio bus for receiving digitized audio signals from each of said plural audio channels;
a programmable lookup table providing values corresponding to said plural audio channels;
digitized audio summing means, coupled to said bus receiving means and to said lookup table, for selecting a subset of said audio channels in response to the contents of said lookup table and for summing said selected subset of audio channels together; and means for outputting said sum for transmission as an audio signal over a communications link to a digitally trunked RF communications system site.

9. A distributed control audio routing arrangement as in claim 8 wherein said summing means includes multiplier/accumulator means for multiplying digitized audio signals from each of said plural bus channels with an associated corresponding weighting factor stored in said lookup table.

10. A distributed control audio routing arrangement as in claim 8 wherein said time-division multiplexed (TDM) audio bus defines a channel timing, and said arrangement further includes lookup addressing means coupled to said lookup table for providing a sequence of addresses to said lookup table at a rate that is substantially a multiple of audio bus (TDM) channel timing.

11. In a digitally trunked radio frequency communications system distributed control multisite network switch of a type coupling together plural audio sources/destinations so as to selectively route audio signals between said plural audio sources/destinations, a distributed control audio signal routing arrangement comprising:
a time-division multiplexed digitized audio signal bus providing plural separate time slots;
a digital message network for communicating status information between said plural audio sources/destinations; and
an audio communications processor coupled to at least one of said audio sources/destinations and also coupled to said control message network and to said audio signal bus, said audio processor including audio source circuitry that broadcasts audio signals provided by said audio source/destination over a predetermined one of said plural time slots on said audio signal bus, said audio communications processor further including audio destination circuitry that autonomously determines whether or not to provide, to at least one of said plural audio sources/destinations associated therewith, audio signals carried by particular time slots on said audio bus based at least in part on said status information conveyed by said digital message network.

12. An audio processor as in claim 11 wherein said audio destination circuitry is programmable to select at least one predetermined time slot used for audio signals broadcasted over said bus.

13. An audio processor as in claim 11 wherein said audio destination circuitry is programmable to select and combine plural time slots of audio signals broadcasted over said bus.

14. An audio processor as in claim 11 wherein said audio destination circuitry includes:
a lookup table specifying values corresponding to plural time slots of audio signals broadcasted over said bus; and
a digitized audio summer coupled to said bus and to said lookup table, said summer selecting ones of said plural time slots of audio signals in response to said lookup table values and summing said selected signals together.

15. An audio processor as in claim 11 wherein said audio destination circuitry includes a bank of shift registers and associated latches coupled to said audio bus, said bank receiving digitized audio signals from plural time-division-multiplexed bus slots and providing parallel outputs representing said plural channels.

16. A distributed control audio signal routing arrangement as in claim 11 wherein said status information is distributed via said digital message network using a carrier-sense multiple-access (CSMA) communications protocol.

17. In a radio frequency (RF) communications system including multiple digitally trunked RF transceiving sites for establishing radio contact with mobile and/or portable radio transceivers, a distributed control audio routing arrangement coupled between said multiple sites and comprising:
at least one multiplexed digitized audio signal bus;
at least one digital message communications link;
multiple digitized-audio signal source means each associated with a respective one of said multiple digitally trunked RF transceiving sites, each for applying, to said audio signal bus, digitized audio signals received by an associated transceiving site; and
multiple digitized-audio signal selection means each associated with a respective one of said multiple digitally trunked RF transceiving sites, said multiple signal selection means each coupled to said audio bus and to said digital message communications link, said multiple signal selection means each for providing distributed audio routing control by autonomously deciding whether or not to receive and convey to a transceiving site associated therewith, audio signals carried by said audio bus based at least in part on digital messages carried by said digital message communications link.

18. An arrangement as in claim 17 wherein each of said plural digitized audio signal source means includes a circuit that time-division multiplexes said digitized audio signals onto said audio bus.

19. An arrangement as in claim 17 wherein:
said audio signal bus comprises a plurality of time-division multiplexed (TDM) signal buses; and
said selection means includes means for accessing a particular digitized audio signal according to a specific TDM bus number and slot position associated with said particular signal.

20. An arrangement as in claim 17 wherein said audio bus comprises a plurality of time-division multiplexed (TDM) signal buses and said plural digitized signal selection means each includes signal receiving means for receiving digitized audio signals from any of said plurality of said TDM signal buses.

21. An arrangement as in claim 20 wherein said signal receiving means comprises a bank of shift registers and associated latches.

22. The arrangement as in claim 21 wherein said bank of shift registers and associated latches is implemented using a programmable ASIC chip.

23. An arrangement as in claim 17 wherein said digitized signal selection means includes means for concurrently selecting plural audio signals carried by said audio bus and
mixing means for mixing together said plural selected digitized audio signals.

24. An arrangement as in claim 17 wherein said digitized signal selection means includes means for storing weighting factors, said signal selection means selecting said digitized audio signals in response to said stored weighting factors.

25. A distributed control audio routing arrangement as in claim 17 wherein said digital messages are distributed via said digital message communication link using a carrier-sense multiple-access (CSMA) communications protocol.

26. In a trunked radio frequency communications system having plural audio source/destination sites including multiple RF transceiving sites for establishing radio contact with mobile and/or portable radio transceivers, a distributed control audio signal routing arrangement for routing audio signals between said RF transceiving sites, comprising:
at least one time-division multiplexed digitized audio signal bus carrying audio signals received by said RF transceiving sites;
a message network for communicating digital trunking messages;
at least one site interface controller associated with each of said transceiving sites, said site interface controller coupled to said message network for applying said digital trunking messages to said message network and for receiving said digital trunking messages from said message network;
at least one audio channel processor coupled to said site interface controller, said audio channel processor applying audio signals received by an associated RF transceiving site to said audio signal bus, said audio channel processor selecting digitized audio signals carried by said audio bus in response to said digital trunking messages and providing said selected audio signals to an associated RF transceiving site.

27. A distributed control audio signal routing arrangement as in claim 26 wherein said audio channel processor is programmable to select one or more particular digitized audio signals outputted by said audio processor over said bus.

28. A distributed control audio signal routing arrangement as in claim 26 wherein said audio channel processor includes:
a look-up table specifying values corresponding to plural digitized audio signals carried over said bus; and
a summer coupled to said bus and to said look-up table, said summer selecting particular ones of said plural digitized signals in response to said look-up table values and summing said selected signals together.

29. A distributed control audio signal routing arrangement as in claim 26 wherein said audio channel processor includes a bank of shift registers and associated latches coupled to said audio bus, said bank receiving said digitized audio signals from plural TDM bus channels and providing parallel outlets representing said plural channels.

30. A distributed control audio signal routing arrangement as in claim 26 wherein said message network for circulating digital trunking messages throughout said multisite digital information switching network comprises at least one serial channel bus and said site interface controller means includes means for implementing a carrier-sense multiple access (CSMA) communications protocol between plural site interface controllers over said serial channel bus.

31. In a radio frequency communications system having plural audio source/destination sites of various types including multiple RF transceiving sites for establishing radio contact with mobile and/or portable radio transceivers and having a distributed control multi-site digital information switching network, a distributed control audio information routing system for communicating digitized audio signals between said sites, said routing system comprising:
- at least one digitized-audio signal bus;
- a global message bus network for circulating call activity information throughout said multi-site digital information switching network;
- a controller module means associated with one of said multiple RF transceiving sites for autonomously selecting particular digitized audio signals carried on said audio bus based at least in part on call activity information circulated on said global message network; and
- at least one audio module means connected to said audio bus and responsive to said associated controller module for receiving and providing said particular digitized audio signals to an associated one of said multiple RF transceiving sites.

32. A distributed control audio information routing system as in claim 31 wherein said controller module includes means for storing source/destination call group identification information.

33. A distributed control audio information routing system as in claim 31 wherein said audio module includes means for digitizing analog audio signals from plural audio sources and for providing said digitized audio signals on said digitized-audio bus in a predetermined time slot.

34. A distributed control audio information routing system as in claim 31 wherein said controller module is connected to at least one global message bus for communicating call activity information between sites and for monitoring channel assignment and audio destination information.

35. A distributed control audio information routing system as in claim 31 wherein said audio module means comprises at least one audio control circuit section connected to a plurality of audio channel interface sections, said audio control circuit section including a microprocessor control means for communicating with said controller module means and for providing control and clock signals to said audio channel interface sections.

36. A distributed control audio information routing system as in claim 31 wherein said audio module means comprises at least one audio control circuit section connected to a plurality of audio channel interface sections, each of said audio channel interface sections connected to said digitized-audio bus and comprising a bank of shift registers and associated latches for receiving digitized audio signals from said digitized-audio bus.

37. A distributed control audio information routing system as in claim 36 wherein each of said audio channel interface sections further comprising a memory means for storing weighting values corresponding to slots on said TDM audio bus and a summer for selecting digitized audio signals from particular slots in response to said weighting values.

38. A distributed control audio information routing system as in claim 31 wherein said global message bus network for circulating call activity information throughout said, multi-site digital information switching network comprises at least one serial channel bus and said controller module means associated with each site includes means for implementing a carrier-sense multiple-access (CSMA) communications protocol between plural site interface controllers over said serial channel bus.

39. In a multi-site RF communications arrangement having a distributed control multisite digital information switching network including sites comprising conventional RF mobile communications systems and/or trunked communications systems, a distributed control audio information routing system for communicating digitized audio signals between switching network communication nodes associated with said sites via at least one time-division-multiplexed (TDM) audio bus, a portion of said distributed control located at a switching network node associated with each site comprising:
- a microcomputer controller for storing site identification information and channel/slot assignment information and for autonomously discerning which particular digital audio channels of a plurality of audio channels carried on said TDM audio bus contain active audio signals designated for a site assigned to said controller for selection for routing by an audio interfacing circuit; and
- at least one audio signal interfacing circuit associated with said controller and connected to said TDM audio bus for receiving digitized-audio signals and for placing digitized-audio signals onto said TDM audio bus, said interfacing circuit including channel selection means responsive to said controller for selecting said particular digital audio channels from said TDM audio bus and for providing audio signal information contained within said channels to a specific destination.

40. A distributed control audio information routing system as in claim 39 wherein said audio signal interfacing circuit includes means for digitizing analog audio signals from a plurality of audio sources and for providing said digitized audio signals on said TDM audio bus in predetermined time slots.

41. A distributed control audio information routing system as in claim 39 wherein said audio signal interfacing circuit includes means for mixing digitized-audio signals corresponding to a plurality of particular selected audio messages from said TDM bus.

42. A distributed control audio information routing system as in claim 39 wherein said channel selection means comprises a bank of shift registers and associated latches for receiving digitized audio signals from said TDM audio bus, a memory means for storing weighting values corresponding to specific channel time slots on said TDM audio bus and a summer for selecting digitized audio signals from particular slots in response to said weighting values.

43. In a digitally trunked radio frequency communications system including multiple RF transceiving sites for establishing radio contact between mobile and/or portable radio transceivers located in different ones of said multiple RF transceiving sites via trunked RF communications channels based on received and transmitted trunking control signals, a distributed control audio signal routing arrangement for rapidly and efficiently routing audio signals between said multiple RF transceiving sites, said arrangement comprising:
- at least one multiplexed digitized-audio signal bus;
- a message network for communicating trunking control messages; and
- at least one site interface controller associated with one of said multiple RF transceiving sites and coupled to said message network, said site interface controller for:
  - (a) applying audio signals received by an associated RF transceiving site to said digitized-audio signal bus;

(b) applying trunking control messages to said message network based on digital trunking signals received by an associated RF transceiving site;
(c) receiving trunking control signals from said message network; and
(d) autonomously determining whether or not to route audio signals carried by said bus to an associated RF transceiving site based at least in part on said trunking control signals received by said step (c).

44. A distributed control audio signal routing arrangement as in claim 43 wherein said site interface controller includes at least one audio channel processor providing control and clocking signals for controlling the accessing and broadcasting of a plurality of channels, of digitized audio signals on said audio bus.

45. A distributed control audio signal routing arrangement as in claim 44 wherein said site interface controller further includes at least one bidirectional audio channel interfacing circuit coupled to said audio bus and responsive to said control and clocking signals from said audio channel processor for broadcasting a digitized-audio signal channel from an associated RF transceiving site on said audio bus and for accessing a subset of digitized audio signals carried over said audio bus and providing said selected subset to said associated transceiving site.

* * * * *